United States Patent [19]

Denk et al.

[11] Patent Number: 5,455,470
[45] Date of Patent: Oct. 3, 1995

[54] ELECTRICAL MACHINES AND COMPONENTS THEREOF INCORPORATING FOIL JOURNAL BEARINGS

[75] Inventors: Joseph Denk, Manhattan Beach; Richard Fischer, Rolling Hills Estates; Alston L. Gu, Rancho Palos Verdes, all of Calif.

[73] Assignee: AlliedSignal Inc., Morristown, N.J.

[21] Appl. No.: 214,485

[22] Filed: Mar. 17, 1994

[51] Int. Cl.⁶ .............................. H02K 5/16; H02K 7/08; H02K 1/12
[52] U.S. Cl. .............................. 310/90; 310/254
[58] Field of Search .............................. 310/90, 194, 164, 310/254, 262; 384/103

[56] References Cited

U.S. PATENT DOCUMENTS

| | | | |
|---|---|---|---|
| 4,435,839 | 3/1984 | Gu et al. | 384/103 |
| 4,459,047 | 7/1984 | Silver | 384/105 |
| 4,459,501 | 7/1984 | Fawzy | 310/164 |
| 4,464,068 | 8/1984 | Potrykus | 384/103 |
| 4,547,713 | 10/1985 | Langley et al. | 310/164 |
| 4,709,180 | 11/1987 | Denk | 310/194 |
| 4,908,347 | 3/1990 | Denk | 310/254 |

FOREIGN PATENT DOCUMENTS 2514055 10/1976 Germany .............................. 384/103

Primary Examiner—Clayton E. LaBalle
Attorney, Agent, or Firm—John R. Rafter

[57] ABSTRACT

An electrical machine (22) incorporates foil bearings (24) which are radially interposed between the stator assembly (26) and the permanent magnet of a rotor shaft (12), thus reducing the required axial length of the shaft and increasing the rotational speed at which the shaft bends incident to resonance.

15 Claims, 3 Drawing Sheets

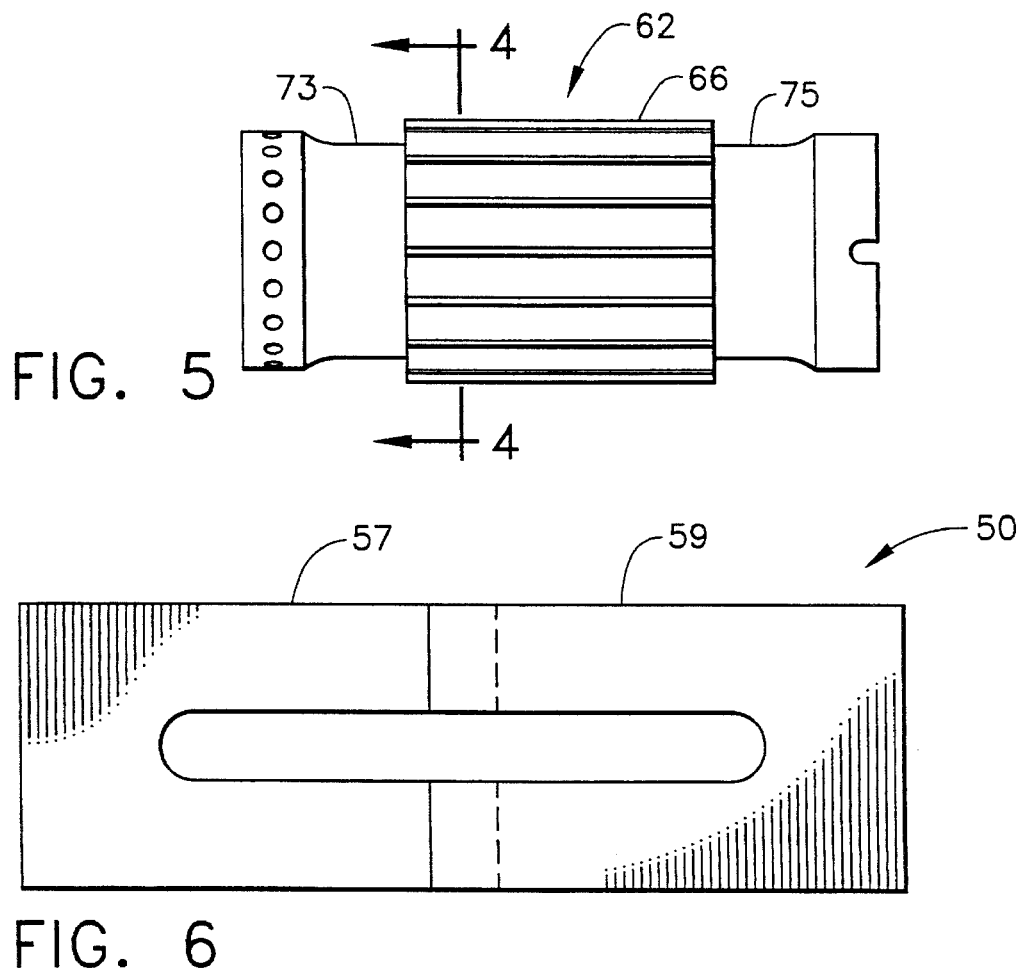
FIG. 5
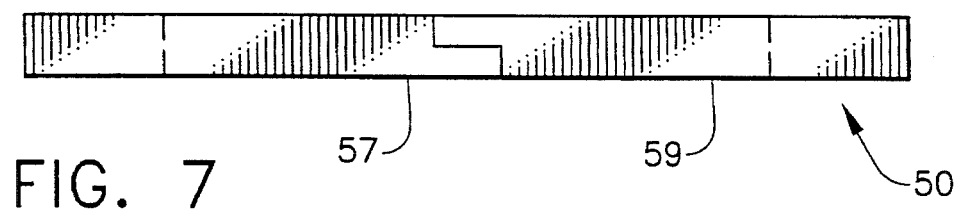
FIG. 6
FIG. 7
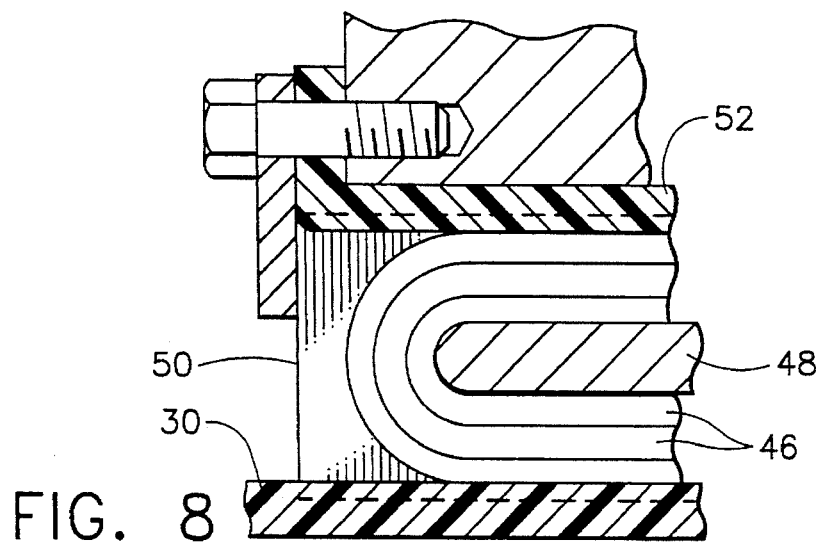
FIG. 8

1

ELECTRICAL MACHINES AND COMPONENTS THEREOF INCORPORATING FOIL JOURNAL BEARINGS

TECHNICAL FIELD

This invention pertains generally to electrical machines such as motors and generators. More specifically, the invention pertains to electrical machines which incorporate foil journal bearings.

BACKGROUND OF THE INVENTION

Foil bearings are currently used in a limited number of applications involving high-speed rotary machines. The use of relatively intricate processes to form metal foils, undersprings, and other components of the bearings results in high manufacturing cost. The use of thermoplastics rather than metals for construction of foil bearings has been proposed as a means for decreasing that cost.

In conventional electrical machines which employ foil bearings, the bearings are mounted on support members which are positioned outboard of the armature. This results in a relatively long rotor shaft. The first bending critical speed of the rotor shaft (i.e. the rotational speed at which bending of the shaft occurs as a result of resonance) is inversely related to its axial length. Often, the desired operating speed of the machine cannot be achieved without encountering the bending phenomenon, and the machine must be operated at a speed lower than that desired in order to maintain an acceptable critical speed margin.

This invention is directed in part to heretofore unrecognized advantages associated with alternative positioning of foil bearings in electrical machines. Specifically, an object of the invention is to reduce and optimize the axial length of such machines, thus extending their safe operating speeds and providing the further advantages of increased compactness and decreased weight.

Another object of the invention is to provide a novel winding assembly adapted for use in certain embodiments of the invention.

A further object of the invention is to provide a novel stator assembly adapted for use in other embodiments of the invention.

SUMMARY OF THE INVENTION

The invention is, in a first aspect, an electrical machine such as a motor or generator which comprises a rotor shaft having a two-pole permanent magnet, and which is provided with foil bearings which are, at least in part, radially interposed between the magnet and the stator assembly.

Other aspects of the invention relate to specific components, assemblies, or subassemblies of such machines. Specifically, a novel winding assembly and stator assembly are provided with components which are adapted to receive the foil bearings such that the forementioned radial interposition is achieved without the use of additional machine components.

DESCRIPTION OF THE DRAWINGS

FIG. 5 is an elevational view of the wire support member illustrated in FIG. 4, shown in isolation from the windings.

FIGS. 6 and 7 are side elevations of a phase insulator as shown in FIG. 3.

FIG. 8 is a fragmentary cross-section of the stator assembly of FIG. 3.

DESCRIPTION OF THE PREFERRED EMBODIMENT

Figure 1:
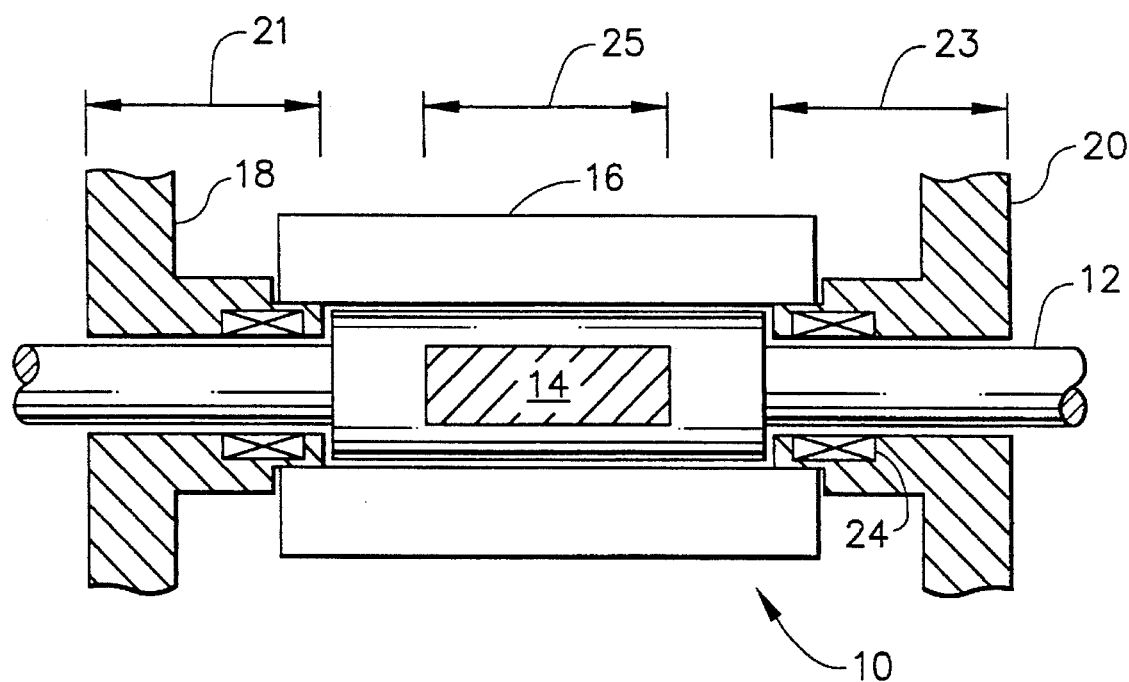
FIG. 1 is a schematic drawing of a prior art electrical machine employing foil bearings.

In FIG. 1 of the drawings, the number 10 designates an electrical machine such as a motor that employs foil bearings in a conventional manner. The machine 10 is comprised of a rotor assembly 12 (hereinafter, 'rotor') including a permanent magnet 14. The rotor 12 may be constructed as described, for example, in U.S. Pat. No. 4,667,123 Denk. Circumscribing the rotor 12 is a stator assembly 16 connected to the machine housing (not shown). On each side of the stator assembly 16 is an end support member 18, 20 also connected to the housing. Each end support member 18, 20 holds a foil journal bearing 24 which cooperates with the rotor 12 to provide aerodynamic or hydrodynamic support during high-speed rotation of the latter. It will be observed that the end support members 18, 20 are positioned outside of the immediate vicinity of the magnet 14. That is, no part of either foil bearing is radially interposed between the magnet 14 and the stator assembly 16, as is illustrated in the drawing by the axial ranges 21, 23, 25 of the support members 18, 20 and the magnet. Moreover, to the extent that the support members 18, 20 are dimensioned and otherwise adapted to support the foil bearings 24, they add unnecessary weight to the machine 10.

Figure 2:
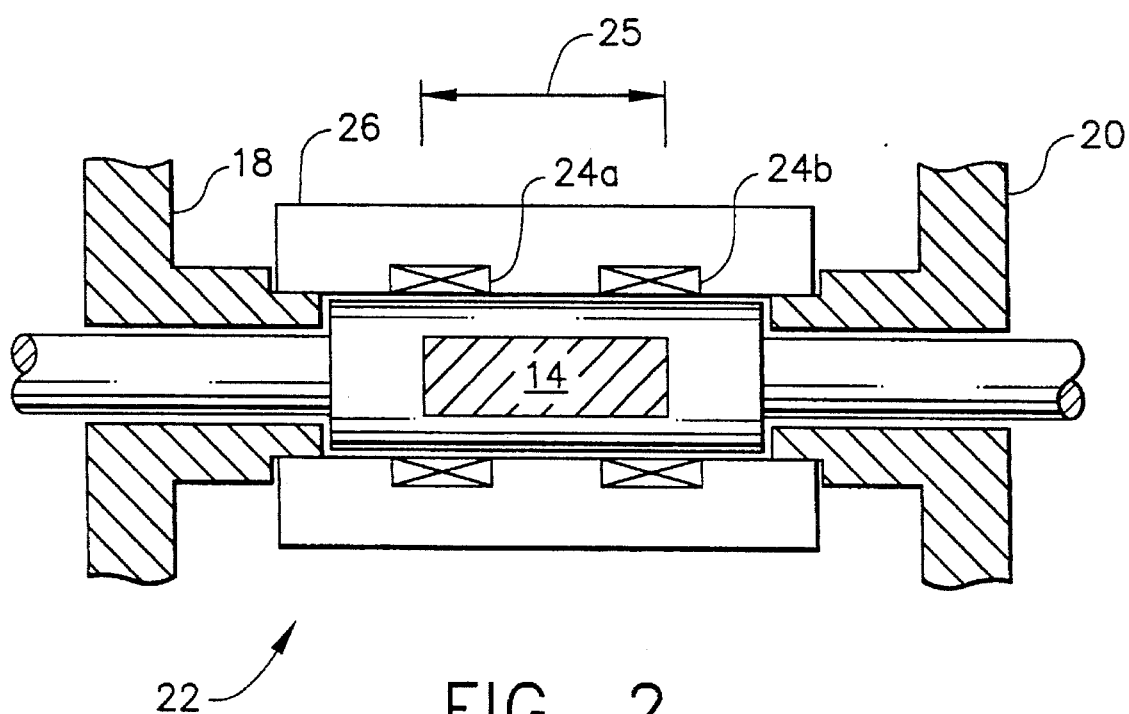
FIG. 2 is a schematic drawing of the invention.

By contrast, in the electrical machine 22 of FIG. 2 the foil bearings 24a, 24b, are, at least in part, radially interposed between the magnet 14 and the stator assembly 26. Alternatively, the entire axial lengths of the bearings 24a, 24b may be radially interposed between the magnet 14 and the stator assembly 26, or a single but unconventionally long bearing may be similarly positioned. Moreover, by securing the bearings 24a, 24b to the stator assembly 26, the end support members 18, 20 (FIG. 1) can be made more compact. Consequently, the machine 22 can be made lighter, and the rotor 12 can be made axially shorter than in the machine 10 of FIG. 1.

Figure 3:
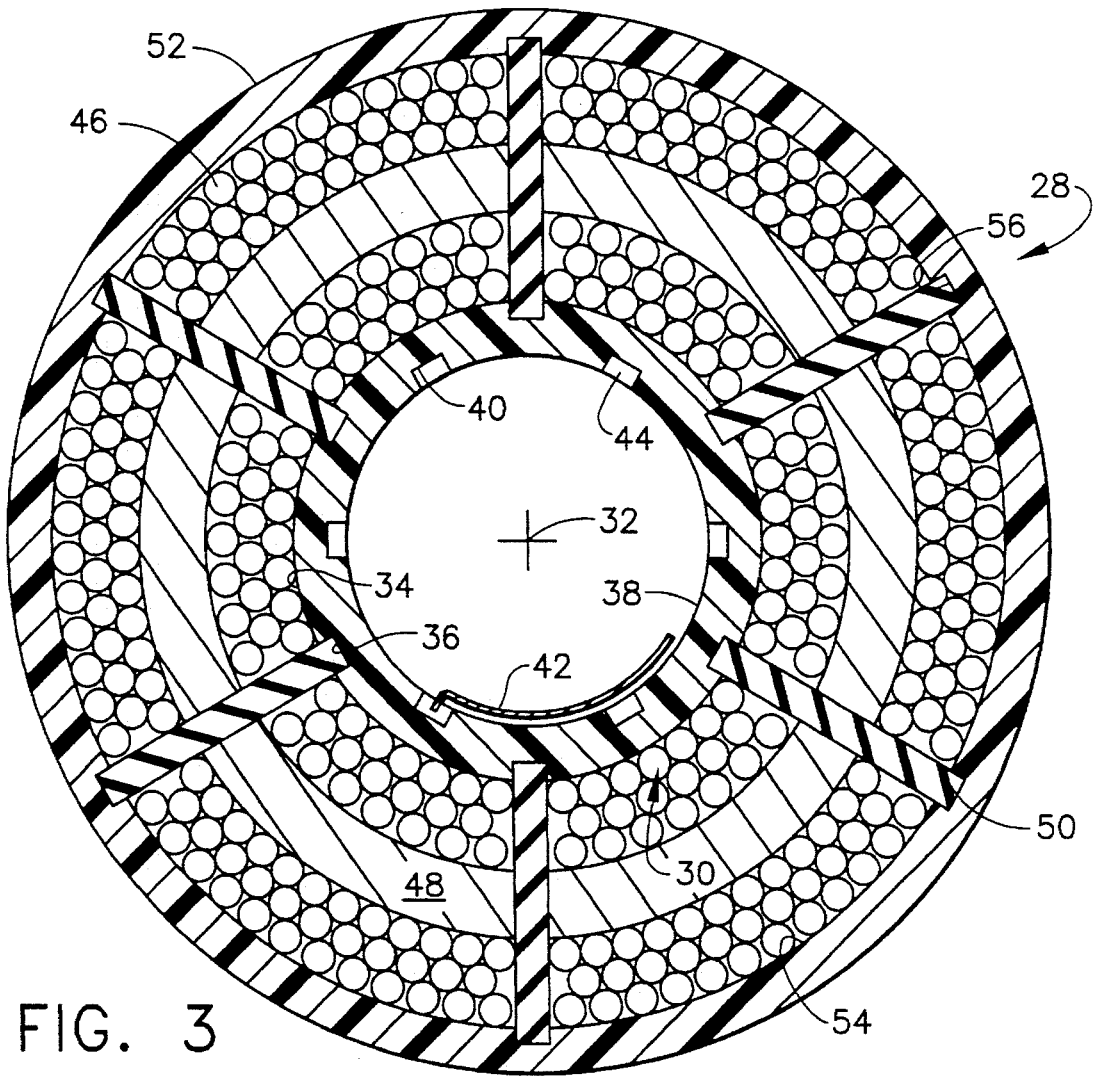
FIG. 3 is a fragmentary cross-section of a stator assembly, illustrating a bore seal adapted for use in certain embodiments of the invention.

Referring now to FIG. 3, a stator assembly 28 in accord with a preferred embodiment of the invention is comprised of a generally tubular bore seal 30 defining a longitudinal axis 32. The seal 30 is preferably composed of a suitable nonconductive thermoplastic and is formed by injection molding. The seal 30 forms a crenulate radially outer surface 34 having a set of circumferentially spaced and axially extending slots (as at 36). In a three-phase motor, for example, six equally spaced slots 36 are provided. The seal further forms a crenulate radially inner surface 38 having a second set (typically three to ten) of circumferentially spaced and axially extending slots (as at 40), each of which receives a foil bearing element (as at 42). The foil elements 42 are radially retained by the rotor 12 upon assembly of the entire machine 22 (FIG. 2). The elements 42 are axially retained at one end by dead ends (as at 44 formed by the slots 40, and at the opposite axial end by a retaining ring (not shown) fitted in a circumferential groove formed at the appropriate axial end of the inner surface 38. Six wire windings (as at 46) are toroidally wound around a cylindrical flux collector 48 which circumscribes the seal 30. The windings 46 are separated by six circumferentially spaced and axially extending phase insulators (as at 50). A generally cylindrical assembly retainer 52 circumscribes the windings 46, collector 48, and seal 30. The retainer 52 forms a crenulate radially inner surface 54 having six circumferentially spaced and axially extending slots (as at 56) which are radially aligned with the slots 36 formed by the radially outer surface 34 of the seal 30. The phase insulators 50 are received in the aligned slots 36, 56 as indicated and are captively retained between the seal 30 and the retainer 52. As illustrated in FIGS. 6 and 7, each insulator 50 is formed from two U-shaped components 57, 59 adjoined at a lap joint. These components combine to surround the flux collector 48 in an axial direction at each respective circumferential location of the insulators 50.

Figure 4:
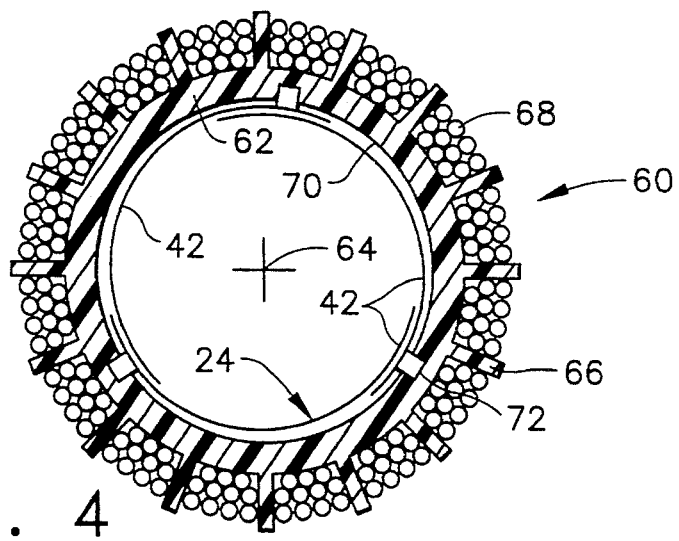
FIG. 4 is a cross-section of a winding assembly adapted for use in other embodiments of the invention.

FIG. 4 illustrates a winding assembly and bearing combination 60 for an electrical machine 22 (FIG. 2) incorporating the invention in a less preferred embodiment. A winding support 62 defining a longitudinal axis 64 thereof is formed as an axially elongate member having a circumferentially spaced plurality of axially extending ribs (as at 66). A plurality of axially extending wire windings (as at 68) are captured between and circumferentially separated by the ribs 66. Typically, the windings are radially secured by a high-temperature polyamide tape (not shown) wrapped around the radially projecting ribs 66. The winding support 62 forms a generally cylindrical, radially inner surface 70 that is interrupted by a circumferentially spaced set (typically, three to ten) of slots (as at 72) which extend from the radially inner surface into the support in a radially outward direction, but are slanted toward the trailing edges of the respective foil bearing elements 42. A numerically equal set of foil bearing elements 42 are received in the slots 72 and collectively form a foil journal bearing 24. As with the embodiment of FIG. 3, the bearing elements 42 are radially retained between the winding support and the rotor 12 upon assembly of the entire machine 22, and are axially retained by means similar to that illustrated and described for the prior embodiment. In the associated stator assembly (not shown), the winding support 62 is surrounded by a cylindrical flux collector 48 (FIG. 3).

FIG. 5 illustrates the winding support 62 in isolation from the wire windings 68 (FIG. 4). Because the windings are not toroidally wound, the support 62 includes axial-length segments 73, 75 which support the end-turns of the otherwise axially extending windings 68. This arrangement results in in a relatively long axial length for the associated stator assembly, as compared to the embodiment of FIGS. 3 and 8 in which the windings 46 are toroidally wound around the flux collector 48.

It will be understood by those skilled in the art that the foil bearing elements 42 are schematically illustrated as bearing sheets, but may also include known or later developed refinements of what amount are known as undersprings, stiffeners, and cooling means. (See, e.g. U.S. Pat. Nos. 4,701,060 Gu and 4,795,274 Gu). Also, the undersprings and/or stiffeners may incorporate a variable spring geometry which conforms to the pressure profile in a given application.

The foil bearing elements 42 are preferably formed from an electrically nonconductive material to avoid high-frequency eddy current losses otherwise resulting from the rotating magnetic field. Examples of such materials include high-temperature thermoplastics, and fiberglass/epoxy composite materials such as BLACKGLAS (available from AlliedSignal, Inc.). Another alternative is to construct each foil element from a plurality of spaced-apart wires held in parallel by a nonconductive binder. In the latter case, the wires should be composed of a metal having a high melting point. As is consistent with prior teaching, it is preferable to provide a slight overlap for adjacent foil elements 42.

The foregoing portion of the description, which includes the accompanying drawings, is intended to serve a pedagogical purpose and is not intended to restrict the scope of the invention.

What is claimed is:

1. Stator assembly and bearing apparatus for an electrical machine, comprising in combination:

a generally tubular bore seal defining a longitudinal axis thereof and forming a crenulate radially outer surface to provide a first set of circumferentially spaced and axially extending slots; the seal further forming a crenulate radially inner surface to provide a second set of circumferentially spaced and axially extending slots;

a cylindrical flux collector circumscribing the seal;

a plurality of wire windings toroidally wound around the flux collector;

an assembly retainer circumscribing the windings, flux collector, and seal; the retainer forming a crenulate radially inner surface to provide a third set of circumferentially spaced and axially extending slots which are radially aligned with the first set of slots;

a plurality of circumferentially spaced and axially extending phase insulators received in the first and third sets of slots so as to be captively retained between the seal and the retainer; and a plurality of foil bearing elements received in the second set of slots and collectively forming a foil journal bearing.

2. Apparatus as recited in claim 1 wherein each of the phase insulators is comprised of two U-shaped members which combine to axially surround the stator.

3. Apparatus as recited in claim 1 wherein the bearing elements are electrically nonconductive.

4. A high-speed rotary electrical machine, comprising in combination:

a rotor assembly, said rotor assembly including a permanent magnet, said permanent magnet located on a longitudinal axis;

a stator assembly circumscribing and operatively associated with the rotor assembly, said stator assembly having a first and a second side, said first side connected to a housing by a first end support member, said second side connected to the housing by a second end support member, said end support members enclosing the permanent magnet with respect to the longitudinal axis; and means, between the end support members and radially interposed between the assemblies, for mounting a foil journal bearing to the stator assembly; and a foil journal bearing captively retained by the mounting means and mounted to the stator assembly between the end support members and radially interposed at least in part between the stator assembly and the magnet.

5. A machine as recited in claim 4 wherein the bearing elements are comprised of electrically nonconductive materials.

6. A machine as recited in claim 4 wherein the stator assembly comprises a cylindrical flux collector and a plurality of wire windings toroidally wound around the collector.

7. A machine as recited in claim 6 further comprising a circumferentially spaced plurality of insulators separating the plurality of windings.

8. A machine as recited in claim 6 wherein the bearing elements are comprised of an electrically nonconductive material.

9. A machine as claimed in claim 4 wherein the foil journal bearing is entirely radially interposed between the stator assembly and the magnet.

10. A high-speed rotary electrical machine comprising in combination:
    a rotor assembly, said rotor assembly including a permanent magnet, said permanent magnet located on a longitudinal axis;
    a stator assembly circumscribing and operatively associated with the rotor assembly, said stator assembly attached to a first and second end support member, said end support members enclosing the permanent magnet with respect to the longitudinal axis; and
    a foil journal bearing mounted to the stator assembly between the end support members and at least partially radially interposed between the stator assembly and the magnet.

11. A machine as recited in claim 10 wherein the bearing elements are comprised of electrically nonconductive materials.

12. A machine as recited in claim 10 wherein the stator assembly comprises a cylindrical flux collector and a plurality of wire windings toroidally wound around the collector.

13. A machine as recited in claim 12 further comprising a circumferentially spaced plurality of insulators separating the plurality of windings.

14. A machine as recited in claim 12 wherein the bearing elements are comprised of an electrically nonconductive material.

15. A machine as claimed in claim 10 wherein the foil journal bearing is entirely radially interposed between the stator assembly and the magnet.

* * * * *